Figure 1:
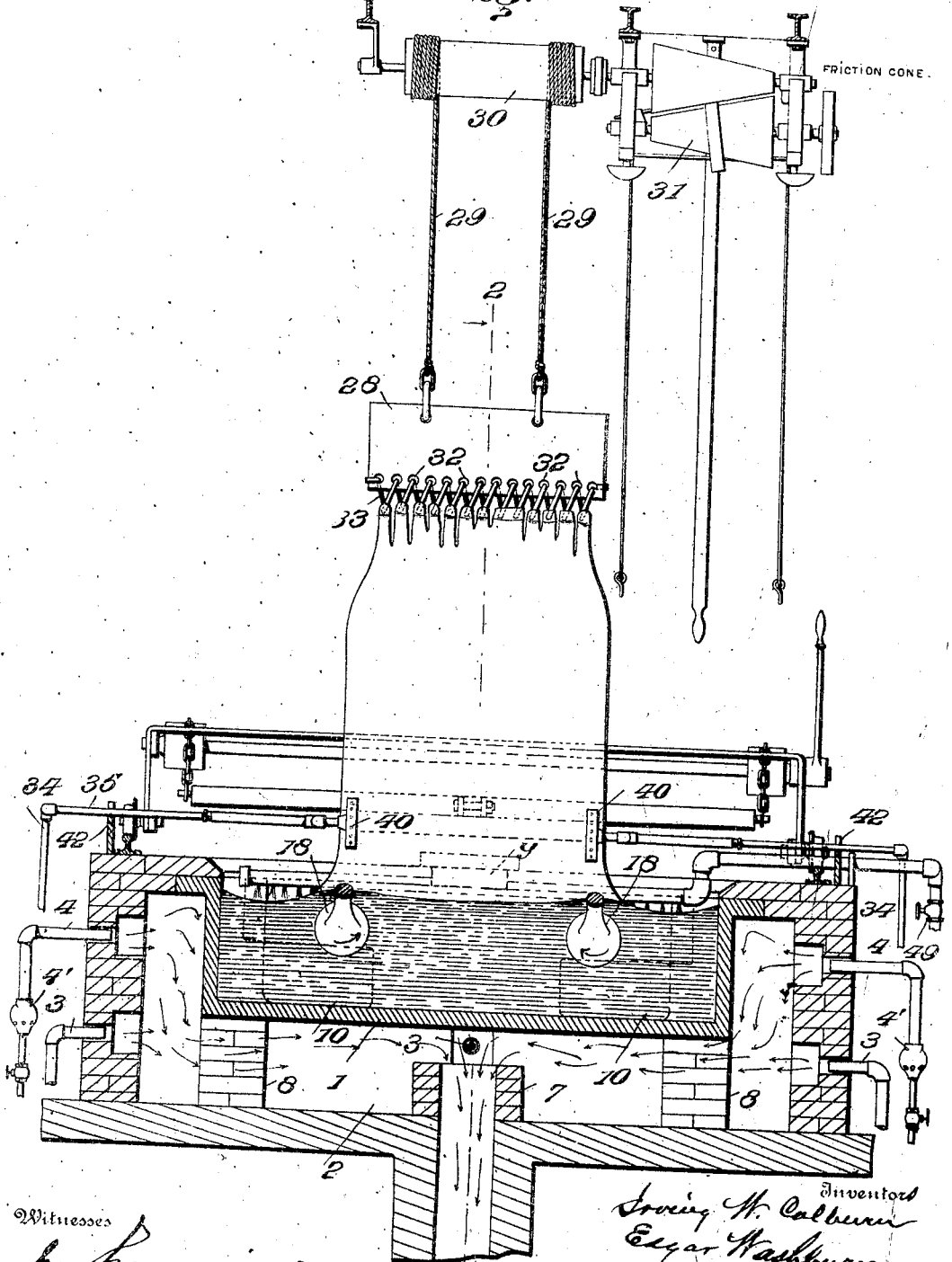

No. 821,785. PATENTED MAY 29, 1906.
I. W. COLBURN, E. WASHBURN & C. W. IRWIN.
PROCESS AND APPARATUS FOR DRAWING SHEET GLASS.
APPLICATION FILED MAY 23, 1904.

4 SHEETS—SHEET 1.

Witnesses

Inventors
Irving W. Colburn
Edgar Washburn
Clifton W. Irwin
By Mauro Cameron Lewis Massie
their Attorneys No. 821,785. PATENTED MAY 29, 1906.
I. W. COLBURN, E. WASHBURN & C. W. IRWIN.
PROCESS AND APPARATUS FOR DRAWING SHEET GLASS.
APPLICATION FILED MAY 28, 1904.
4 SHEETS—SHEET 2.
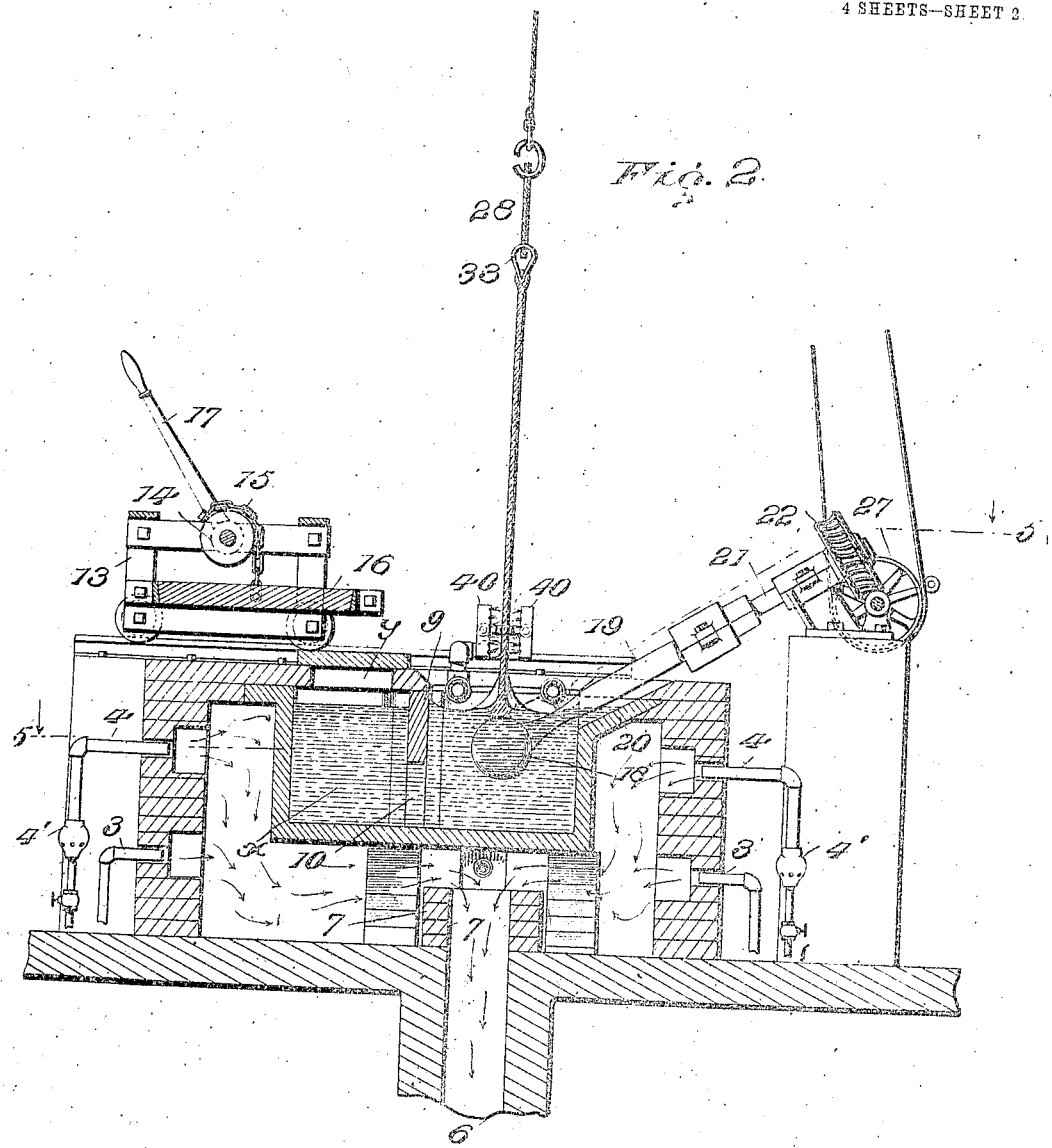
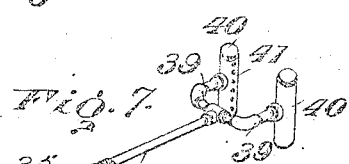

No. 821,785. PATENTED MAY 29, 1906.
I. W. COLBURN, E. WASHBURN & C. W. IRWIN.
PROCESS AND APPARATUS FOR DRAWING SHEET GLASS.
APPLICATION FILED MAY 28, 1904.
4 SHEETS—SHEET 4
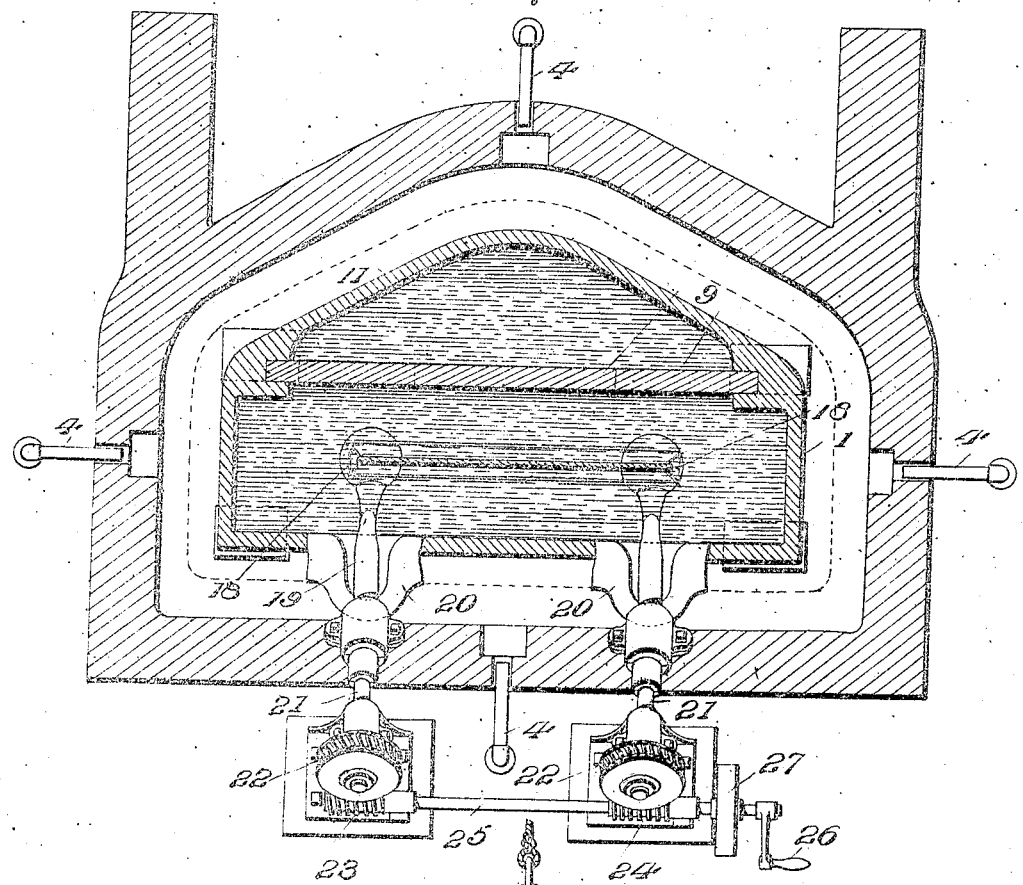
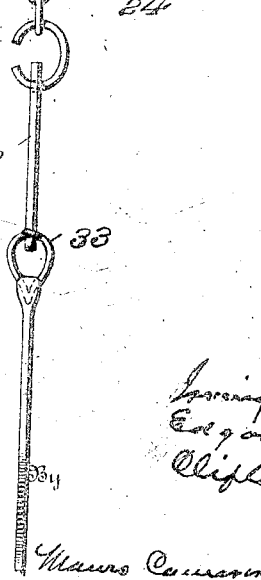

UNITED STATES PATENT OFFICE.

IRVING W. COLBURN, EDGAR WASHBURN, AND CLIFTON W. IRWIN, OF FRANKLIN, PENNSYLVANIA; SAID WASHBURN AND SAID IRWIN ASSIGNORS TO SAID COLBURN.

PROCESS AND APPARATUS FOR DRAWING SHEET-GLASS.

No. 821,785.  Specification of Letters Patent.  Patented May 29, 1906.

Application filed May 28, 1904. Serial No. 210,268.

*To all whom it may concern:*

Be it known that we, IRVING W. COLBURN, EDGAR WASHBURN, and CLIFTON W. IRWIN, of Franklin, Pennsylvania, have invented a new and useful Process and Apparatus for Drawing Sheet-Glass, which invention is fully set forth in the following specification.

This invention relates to the art of glass-working, and more particularly to the drawing of glass in sheet form from a mass of molten glass.

When it is attempted to draw a sheet of glass from a molten mass by inserting a bait therein and slowly moving the bait away from the molten mass, the glass at first is drawn in the form of a sheet nearly the width of the bait, which sheet almost immediately begins to draw narrower and as the operation continues rapidly narrows down, drawing thin to a thread if the operation be continued for any considerable length of time. This tendency of the glass to rapidly narrow when attempts are made to draw sheets of glass has made the drawing of sheet-glass from a mass of molten glass commercially impracticable.

The object of the present invention is to provide a process and an apparatus whereby a sheet of glass may be drawn from a mass of molten glass without narrowing or pulling to a thread during the drawing operation.

With this object in view the invention consists in the process of drawing a sheet of glass from a mass of molten glass and simultaneously lowering the temperature of the extreme outer edges of the sheet as the drawing operation proceeds. This lowering of the temperature may be effected in a variety of ways—as, for example, by directing gentle jets of air against the opposite faces of the sheet immediately adjoining its edges as drawn. These jets are located adjacent to the surface of the molten mass and by reducing the temperature of the sheet as drawn cause it to set. This stiffening or setting of the glass during the drawing operation has the effect of preventing the narrowing of the sheet and maintaining it of uniform width during the drawing operation. In fact, instead of narrowing the sheet may be caused to draw wider and wider by gradually moving the cooling-jets outward from the center or medial line of the sheet, the result being that the sheet will gradually widen as the jets are moved outward.

The invention further consists in drawing glass in sheet form from a mass of molten glass, simultaneously imparting outward movement to the surface of the molten mass adjacent to the edges of the sheet being drawn, and simultaneously cooling the edge portions of the sheet.

While it is stated above that one feature of the invention resides in cooling the edge portions of the sheet, it is not to be understood that it would involve any departure from the invention to cool that portion of the sheet adjacent to the surface of the molten glass which lies between the edges and which may for convenience be designated the "central" portion of the sheet. It is, however, essential that the edge portions be cooled whether the central portion has its temperature reduced or not.

It has been found when drawing a sheet of any extent from a mass of molten glass that under some conditions the surface of the molten mass has a tendency to cool or become lowered in temperature to such an extent as to considerably impair the working condition of the glass around the outer confines or partition-walls of the receptacle containing the same. With a view to overcoming this difficulty the invention further consists in drawing glass in sheet form from a mass of molten glass and cooling the edges thereof as drawn while maintaining the surface of the molten mass, and particularly the edge portions of said mass, in working condition by the application of heat to said surface. Various means may be employed for thus maintaining the temperature of the surface of the mass. As herein shown, this is accomplished by directing a series of jets of flame downward against the surface of the molten mass adjacent to the outer edges or limits of the receptacle containing the same. These jets may in some cases be directed against the surface of the molten mass perpendicularly; but preferably each jet of flame has a downward and outward direction impinging upon the surface of the glass at an acute angle. This is accomplished by placing within the mouth of the receptacle containing the molten glass a gas-conduit provided with a series of jet-openings directed outwardly and downwardly, such conduit being just above but immediately adjacent to the surface of the molten glass in the receptacle. This heating of the surface at the point or line where it draws away from the confining wall avoids the tendency of the glass to take impressions from such wall, which impressions appear as waves in the surface of the finished sheet.

In addition to the features indicated above the invention consists in minor details of construction and methods of operation, which will be more specifically hereinafter described and then pointed out in the claims.

It will be understood that the inventive idea involved in the above-mentioned process may receive various expressions without losing its identity and a variety of forms of apparatus may be employed in practicing the process. Moreover, the inventive idea of means and devices constituting the mechanical part of the invention may receive various mechanical expressions, one of which is shown in the accompanying drawings for the purpose of illustrating the invention. Such drawings, however, are for the purpose of illustration only and not for the purpose of defining the limits or scope of the invention.

Figure 3:
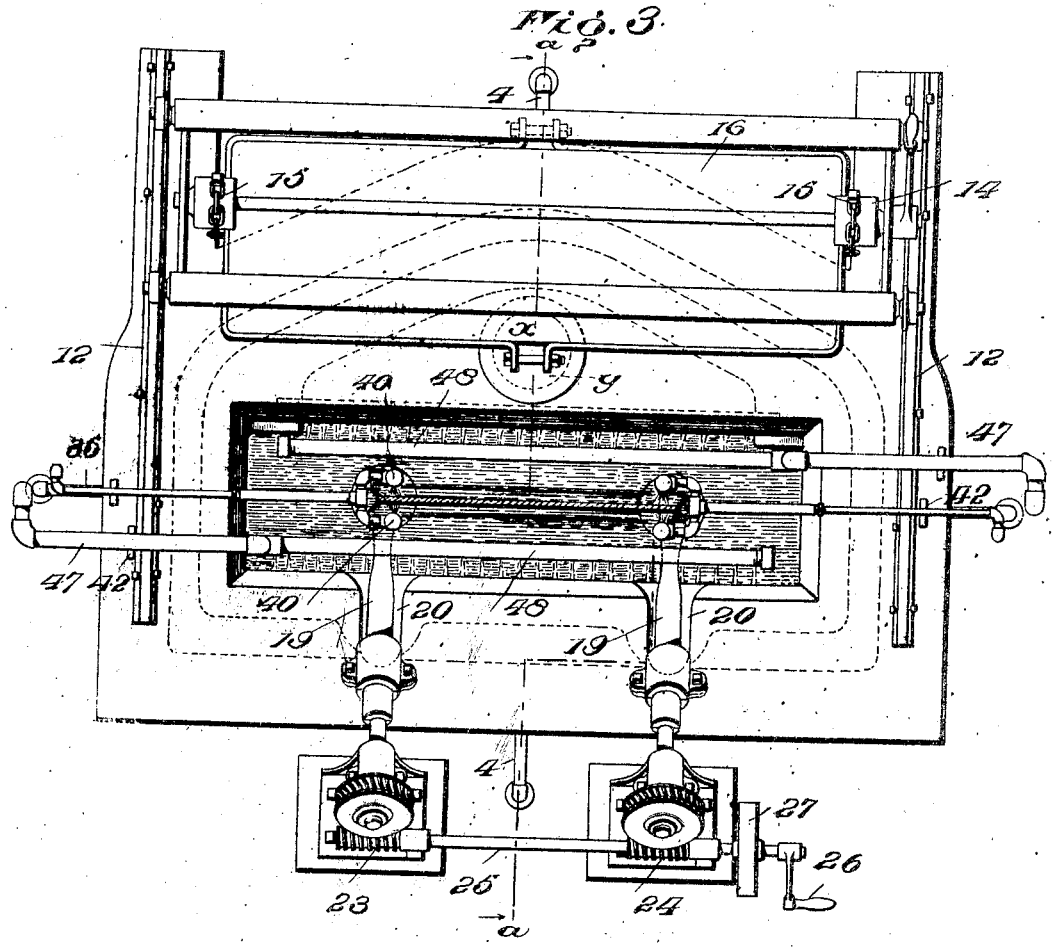
Figure 4:
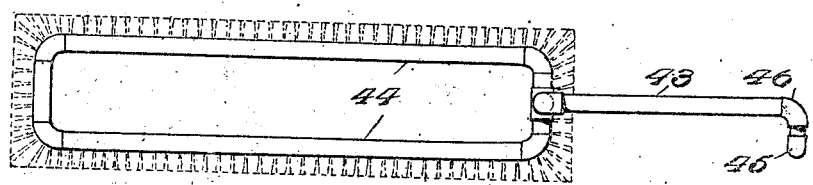

In said drawings, Figure 1 is a vertical transverse section through the working chamber or pot and the heating-surface surrounding the furnace, the remaining portions of the apparatus being shown in front elevation. Fig. 2 is a vertical section taken at right angles to Fig. 1 on the line 2 2 of said figure. Fig. 3 is a top plan view of that portion of the apparatus shown in Fig. 1 below the bait, the sheet of glass being shown in horizontal section. Fig. 4 is a plan view of the jet-conduit for heating the surface of the molten glass adjacent to its edges during the drawing operation. Fig. 5 is a horizontal section taken on the line 5 5, Fig. 2. Fig. 6 is a side elevation of a bait with a sheet of glass attached thereto, and Fig. 7 is a detailed view of the apparatus employed for directing the cooling-jets against the edges of the sheet of glass as the same is being drawn.

Referring to the drawings, 1 is a working chamber or pot surrounded by heating-chamber 2, supplied with heat from two sets of burners 3 and 4. Of these burners the series 3 3 enter the heating-chamber in a place preferably just below the bottom of the working chamber or pot 1, and, as will appear from an inspection of Figs. 1 and 2, they are arranged in pairs, so that a jet of flame directed on one side will meet a jet of flame from another jet or burner 3 immediately opposite the same, the jets of flame from the various burners 3 converging or meeting substantially under the middle of the working chamber or pot. On the other hand, the burners 4 are in a plane considerably above the bottom of the working chamber and are of the Bunsen type, as indicated at 4', where provision is made for the introduction of air and the mixture of the same with the gas as it proceeds toward the opening of the burner into the heating-chamber. This heating-chamber is provided with offtake-flue 6, which is preferably arranged to conduct the products of combustion downward from a point immediately beneath the working chamber or pot and has its mouth or opening surrounded by a raised part 7, projecting considerably above the lower or bottom portion of the heating-chamber. It will be understood that the working chamber or pot is supported as upon piers 8 8 within the heating-chamber and is of oblong rectangular form, its rear side or face, however, bulging outward considerably to form a receiving-chamber $x$, having a filling-in opening $y$ in its top. This bulging or segmental portion of the working pot is divided from the main or operating portion by a partition 9, through the lower portions of which are openings 10 10. (Shown in dotted lines in Fig. 1 and in full lines in Fig. 2.) The working chamber or pot 1 and the receiving-chamber 11 are, with the exception of this partition 9, preferably integral.

Provision is made for covering the working chamber or pot during the intervals between the drawing operations and for removing and transporting the cover to one side while the sheet of glass is being drawn. Referring to Figs. 2 and 3, 12 12 are rails or ways mounted upon the upper portion of the superstructure, upon which ways a carriage 13 is mounted to travel, which carriage is provided with drums 14 14, to which are secured a pair of chains or cables 15, the other ends of said chains or cables being attached to the cover 16, the drums 14 14 being operated by a lever 17, whereby the cover 16 may be raised or lowered, as the case may be. As shown in Fig. 2, the cover has been elevated and the carriage moved to one side in order to expose the glass in the working chamber or pot for the purpose of drawing the sheet therefrom.

For the purpose of imparting movement to the surface of the molten glass in the working chamber or pot away from the medial line of the sheet as it is being drawn means are provided for revolving a pair of bodies in the mass of molten glass just beneath the surface thereof and at points approximately under what is designed to be the edges of the sheet when drawn to its extreme width. These bodies are in the form of spheres 18 18 of suitable refractory material provided with shafts 19 19, inclined upwardly and outwardly, and to accommodate this upward and outward inclination of the shafts 19 the forward side of the working chamber or pot 1 is provided with two outwardly and upwardly flaring lips 20 20. (See Figs. 2 and 5.) The upward ends of the shafts 19 are polygonal in cross-section, these polygonal ends fitting in corresponding sockets secured to rotate with shafts 21 21, which shafts have on their outer ends worm-gears 22, 22, gearing with right and left hand worms 23 and 24 on shaft 25, driven either by crank 26 or by power applied to pulley 27. (See Fig. 5.) The revolutions of the shaft 25 are such as to slowly revolve the spheres 18 18 in the direction indicated by the arrows in Fig. 1, and the spheres being near the surface of the mass of molten glass their revolution causes the surface portion of the molten mass to slightly rise or form an undulation immediately over the spheres and slowly move away from the medial line of the sheet of glass being drawn and in the direction of the edges of the sheet.

In practicing the process any suitable bait and means for moving it outwardly from the mass of molten glass may be employed. Preferably, however, the bait shown in Figs. 1, 2, and 6 is employed. This bait consists of a plate 28 of any suitable material, as metal, suspended from a pair of cables 29 29, passing over a drum 30 and driven by any suitable power, as by an Evans friction-cone 31. (Shown in Fig. 1.) For the purpose of providing points of attachment for the sheet of glass to the plate 28 this plate has formed therein near its lower edge a series of holes or perforations 32, and through these holes or perforations a coil of wire 33 is threaded after the manner shown in Fig. 1. This coil, if desired, may be a regular cylindrical spiral, but preferably the outline of the coil in cross-section is such as shown in Figs. 2 and 6, wherein the lower edge or side of the coil has flattened, so that each spiral forms a rounded point.

When a sheet of glass is drawn from a mass of molten glass from between or just above the revolving bodies 18 18, the tendency of the sheet to narrow or draw to a thread is practically overcome. We have discovered that the sheet may be caused to gradually widen during the drawing operation to lines nearly approaching the outside limits of the revolving bodies 18 18. This result is accomplished by cooling the edges of the sheet as soon as the glass assumes sheet form. This cooling action may be accomplished in a variety of ways. As herein shown, this is accomplished by directing cooling air-jets against the sheet close to its two edges and at points only slightly above the surface of the mass of molten glass in the working chamber. For the purpose of thus directing the cooling jets of air against the sheet there are employed conduits 34 34 on opposite sides of the furnace, to which conduits are attached pipes 35, Fig. 7, by a flexible joint 36, which enables the pipe 35 to be turned in a vertical plane. Telescoped in the pipe 35 is a pipe 37, passing through a suitably-packed joint 38, and bearing on its outer end forked or divided conduits 39 39, each of which enters a chamber 40 40. These chambers 40 40 have a series of small air-openings 41 (see Fig. 7) on their adjacent sides through which a cooling medium, as jets of air, may be directed against the opposite faces of the sheet of glass as it is drawn. These chambers 40 40 may be simply closed sections of pipe or any other suitable form of chamber may be employed. For the purpose of supporting the pipes 35 in an approximately horizontal position means of support, as brackets 42 42, are mounted upon the piers of the furnace, which brackets are provided with an open bearing or slot within which the pipe 35 rests when in operative position, as will be understood by an inspection of Fig. 1. The flexible joint 36 enables the pipe 35, together with the jet-chambers 40, to be turned about the joint, so as to entirely remove it from its operative position in the furnace when it is desired to cover the furnace for the purpose of heating it for preparing the molten glass therein for the drawing operation. The telescopic joint 38 enables the pipe 37, supporting the chambers 40, to be telescoped within the pipe 35, so as to cause the two jets of air on opposite edges of the sheet to approach each other by drawing out the pipes 37 from the pipes 35 or to recede from each other by pushing the pipes 37 into the pipe 35. The importance of this will appear later on.

For the purpose of avoiding cooling of the working surface of the molten mass during the drawing operation there is provided a means for supplying heat directly to the exposed surface, and particularly to that portion of the exposed surface lying upon the confines or outer edges of the working surface of molten glass. Said means consist of a conduit or conduits bearing a series of gas-jets, which are located near the surface of the molten mass and around the edges thereof, the jets being so positioned as to direct the flame against the surface of the molten mass in a downward and outward direction. Referring to Fig. 4, 43 is a pipe leading from a source of fuel-supply, as gas, and 44 is a ring of pipe connected to 43, the shape of the ring 44 being practically that of the inside of the working chamber or pot 1, though somewhat smaller. This pipe 44 is provided with a series of small openings through which the gas passes, these, in effect, constituting a burner provided with a series of jet-openings. The pipe 43 is connected to the main conduit 45 by a flexible joint 46, whereby the ring 44 may be raised up out of position when it is desired to place the cover 16 over the mass of molten glass in the working chamber. Instead of the ring 44 and a single pipe 43 there may be used a plurality of gas pipes or conduits 47 47, Fig. 3, each connected by flexible joints to a main gas-conduit and each provided with a burner 48, extending in a straight line along the sides of the working chamber or pot adjacent to the surface thereof and provided with small burner-openings, which direct the flame in an outward and downward direction against the surface of the molten glass, as is clearly shown in Fig. 3.

Operation: The glass in the working chamber or pot having been brought to the proper heat and working condition and the burners 3 being ignited, while the burners 4 are turned off, the cover 16 is raised from off the working pot by revolving the drums 14 through the action of the lever 17, and the carriage 13 is run back upon the ways to the position indicated in Fig. 2. The bait having been lowered, so as to permit the lower or pointed portions of the wire-coil to become immersed in the mass of molten glass, the burners for heating the surface of the molten glass being in position and the gas issuing therefrom being ignited, the bait is started upward by revolving the drum 30 and simultaneously with the upward movement of the bait the spheres 18 18 are slowly revolved in the direction indicated by the arrows in Fig. 1, thereby causing the glass on the surface of the molten mass to move slowly away from the medial line of the sheet as it is drawn and in the direction of the sheet's edges. This outward movement of the surface portion of the molten glass exerts a stretching action upon the sheet in the direction of its edges as the sheet is drawn upward by the bait. At this point the jet-chambers 40 40 for directing cooling jets of air against the sides of the sheet near its edges are lowered into position, the pipes 37 being extended sufficiently to bring the openings 41 in the chambers 40 immediately opposite the two faces of the sheet adjacent to its edges. The result is to cause the sheet to draw of a uniform width as long as the jet-chambers 40 remain stationary; but by gradually moving the jet-chambers at the opposite edges of the sheet away from the medial line of the sheet, which is accomplished by telescoping the pipe 37 within the pipe 35, the sheet may be caused to draw wider and wider until in practice the outer edges of the sheet will be considerably outside of the axial line of the revolving spheres 18. At this point in practice the cooling jets of air are maintained in stationary position, as shown in Fig. 1, and the sheet thereafter is drawn of a uniform width. During the drawing action the spheres 18 continue to slowly revolve in an outward direction, and the burners adjacent to the surface of the molten glass continue to supply sufficient heat to maintain the glass at the surface of the molten mass in the proper working condition, the amount of heat thus supplied being regulated by valve 49 in the conduit leading to the burner. The sheet of glass having been drawn to the desired length, the cooling-jets are removed and the direction of revolution of the spheres 18 is reversed, whereupon the sheet of glass will rapidly draw to a thread or rod, which can be severed by cracking off or by shears, thereby leaving the molten mass in suitable condition for repeating the operation, since the surface is not fouled by masses of broken glass falling thereinto. If desired, the cover 16 may then be replaced over the working chamber or pot, and if the drawing operation is not immediately repeated and it is only desired to keep the molten glass in the working chamber or pot in a melted condition the burners 3 3, which have been in use during the drawing operation, are cut off, and the burners 4 4 are ignited, and by directing their jets directly against the sides of the working chamber or pot they serve to keep it in the desired condition during the interval.

The method of drawing a sheet of glass while imparting outward movement to the mass and heating the surface and bottom thereof while the sheet is being drawn and the apparatus for imparting such outward movement and for heating the surface and bottom of the molten mass, as well as the receptacle for the molten glass, divided by a partition with an opening therein, and the bait with the wire coil are not claimed herein, since the same are not the joint invention of ourselves, but are the joint invention of Irving W. Colburn and Edgar Washburn and form the subject-matter of their application, Serial No. 248,288, filed March 3, 1905.

What is claimed is—

1. The method of drawing sheet-glass which consists in preparing a mass of molten glass, drawing a sheet of glass therefrom, simultaneously imparting movement to the surface portion of the molten mass in opposite directions away from the medial line and toward the edges of said sheet, and cooling the edges of the sheet as drawn.

2. The method of drawing sheet-glass which consists in preparing a mass of molten glass, drawing a sheet of glass therefrom while the surface portion of said mass is kept moving away from the medial line of the sheet toward its edges, cooling the edges of the sheet as it emerges from the molten mass, and supplying heat to the surface of said molten mass.

3. The method of drawing sheet-glass which consists in preparing a mass of molten glass, drawing a sheet of glass therefrom while the surface portion of said mass is kept moving away from the medial line of said sheet toward its edges, and cooling the edge portions of said sheet at points which are gradually moved farther apart during the drawing of the sheet.

4. In an apparatus for drawing glass, the combination of a receptacle containing molten glass, means for drawing a sheet of glass therefrom, means imparting motion to the surface of the molten glass in the receptacle away from the medial line of the sheet during the drawing operation, and means for cooling the edge of the sheet as drawn.

5. In an apparatus for drawing sheet-glass, the combination of a receptacle containing a mass of molten glass, means for drawing a sheet of glass therefrom, means imparting motion to the surface of said mass away from the medial line of the sheet and toward its edges during the drawing operation, and cooling means adjacent to the surface of the molten glass and acting on the sheet of glass near its edges.

6. In an apparatus for drawing sheet-glass, the combination of a receptacle containing a mass of molten glass, means applying heat to the bottom of said mass, means for delivering heat to the working surface of said mass, means drawing a sheet of glass from said mass, and means cooling the edges only of said sheet during the drawing operation.

7. In an apparatus for drawing sheet-glass, a receptacle containing a mass of molten glass, means for drawing a sheet of glass therefrom, means directing air-jets against the edges of the sheet of glass as drawn, said last-named means being adjustable toward and from the medial line of the sheet being drawn.

8. In an apparatus for drawing sheet-glass, a receptacle containing a mass of molten glass, means for drawing a sheet of glass therefrom, and a pair of air-jets located upon the structure of said receptacle and adjustable both in vertical and horizontal planes.

9. The method of drawing sheet-glass, which consists in preparing a mass of molten glass, drawing a sheet of glass therefrom, moving the surface of said mass away from the edges of the sheet as the drawing proceeds, and directing a cooling fluid against the edge portions of the sheet only.

10. The method of drawing sheet-glass which consists in preparing a mass of molten glass, drawing a sheet of glass therefrom, applying sufficient heat to the working surface of the molten mass where it draws away from the confining-walls to break up wave formations, and cooling the edge portions of the sheet as it emerges from the molten mass.

11. The method of drawing sheet-glass, which consists in preparing a mass of molten glass, drawing a sheet of glass therefrom, moving the surface of said mass away from the edges of said sheet as the drawing proceeds, applying heat to the working surface of said mass where it draws away from the confining-walls, and cooling the edge portions of the sheet as it emerges from the molten mass.

In testimony whereof we have signed this specification in the presence of two subscribing witnesses.

IRVING W. COLBURN.
EDGAR WASHBURN.
CLIFTON W. IRWIN.

Witnesses:
THOMAS McGOUGH,
W. J. McCONNELL.